June 3, 1930. J. D. FERRY 1,760,979
MATERIAL TREATING AND HANDLING APPARATUS
Filed July 22, 1927 4 Sheets-Sheet 2

June 3, 1930. J. D. FERRY 1,760,979
MATERIAL TREATING AND HANDLING APPARATUS
Filed July 22, 1927 4 Sheets-Sheet 3

Patented June 3, 1930

1,760,979

UNITED STATES PATENT OFFICE

JOSEPH D. FERRY, OF HARRISBURG, PENNSYLVANIA

MATERIAL TREATING AND HANDLING APPARATUS

Application filed July 22, 1927. Serial No. 207,798.

This invention relates to a combined material treating and handling machine especially adapted for use in making pretzels and the like.

Briefly stated an important object is to provide simple and automatic means by which pretzel forms or the like may be positively submerged for a predetermined period in a treating and cooking solution and supplied in uniform order to the receiving end of an oven conveyor or the like, there being simple means by which the pretzel forms are reliably detached from the discharge end of the carrier mechanism of the machine without the possibility of damage to the forms.

A further aim is to provide a material treating and handling machine in which the several conveyors for the material may be easily removed from the cooking solution to permit of the expeditious and thorough cleaning of the conveyors, the solution containing tank and other parts of the machine.

The invention forming the subject of this application also embodies means by which the steam generated incident to the heating of the treating and cooking solution is utilized to avoid the accumulation of solid particles of the solution on such moving parts of the machine as the conveyors and the sprockets therefor, the steam also being directed into contact with the pretzel forms or the like upon leaving the solution whereby the surfaces of the pretzels are improved in quality and appearance and are better prepared for the application and adhesion of salt thereto.

A further object is to provide a machine of the character described in which the drive chain for the several conveyors is caused to move through the treating and cooking solution along with the conveyors so that the expansion of the conveyors and the drive chain will be the same, this feature being calculated to maintain a uniform relation between the conveyors and the driving means therefor.

Another object is to provide a machine of the character specified in which the construction and operation thereof is highly simplified to allow of the control of the machine without the exercise of unusual skill.

Other objects and advantages will be apparent during the course of the following description.

In the accompanying drawings forming a part of this application and in which like numerals are employed to designate like parts throughout the same, Figure 6 is a fragmentary perspective of one end portion of the machine.

Figure 7 is a fragmentary group perspective illustrating the means by which the pretzel forms or the like are positively detached from the supporting or lower conveyor and are fed to the carrier of an oven or the like, Figure 8 is a fragmentary side elevation of the construction illustrated in Figure 7, Figure 9 is a fragmentary plan view illustrating the means by which the pretzel forms or the like are detached from the conveyor, the view also illustrating the means by which a toothed roller is constantly combed to avoid accumulation of matter thereon, Figure 10 is a detail sectional view taken on line 10—10 of Figure 9.

In the drawing wherein for the purpose of illustration is shown a preferred embodiment of the invention the numeral 15 designates a more or less rectangular tank adapted for the reception of a solution through which pretzel forms or the like are passed in preparing the same for introduction into an oven having a conveyor 16. Though the machine is illustrated in Figure 1 in connection with the conveyor 16 of an oven, it is obvious that the invention is not restricted to use in conjunction with an oven, but may be arranged to supply the treated articles to a dryer or any other receiver.

Figures 1, 2:
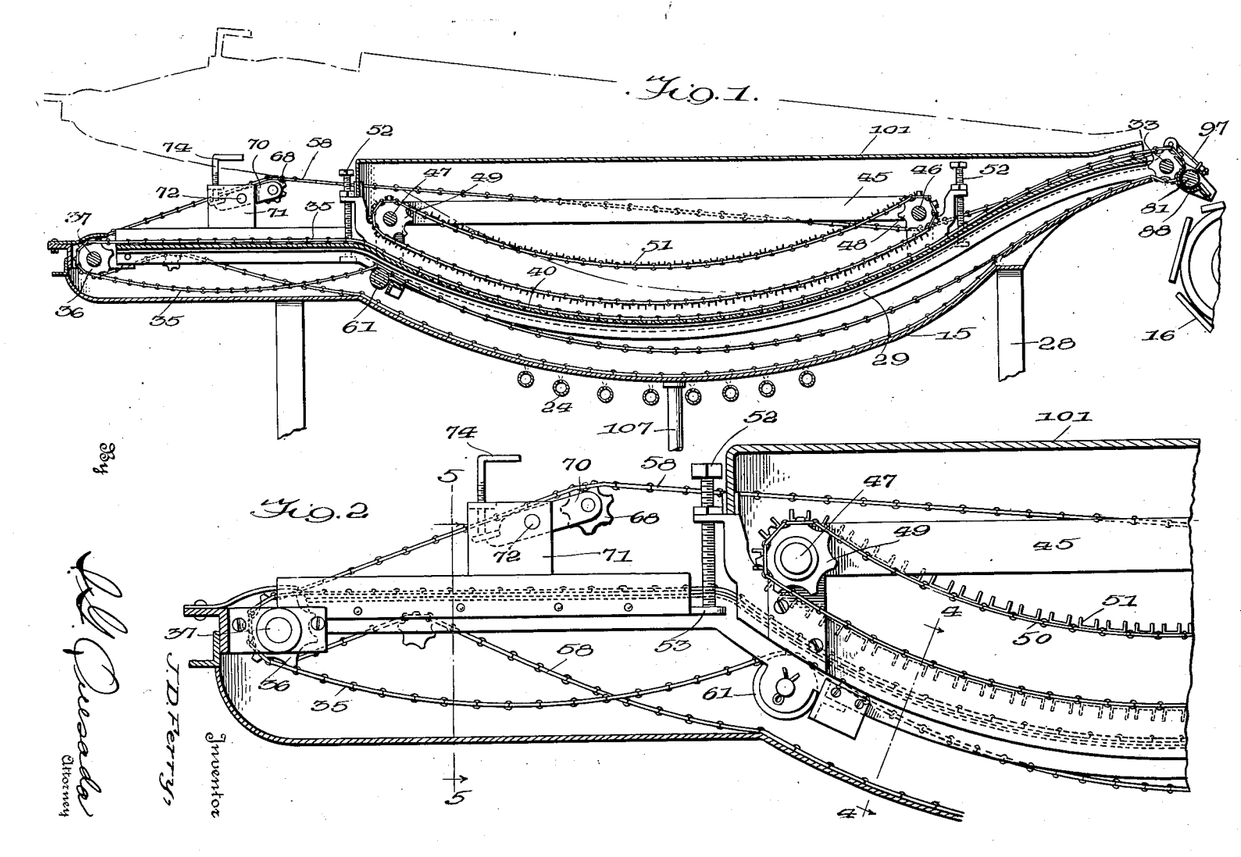
Figure 1 is a fragmentary vertical sectional view through the machine positioned to supply the pretzel forms or the like to the receiving end of an oven conveyor.
Figure 2 is an enlarged fragmentary vertical sectional view through the inlet end portion of the machine.
Figure 3:
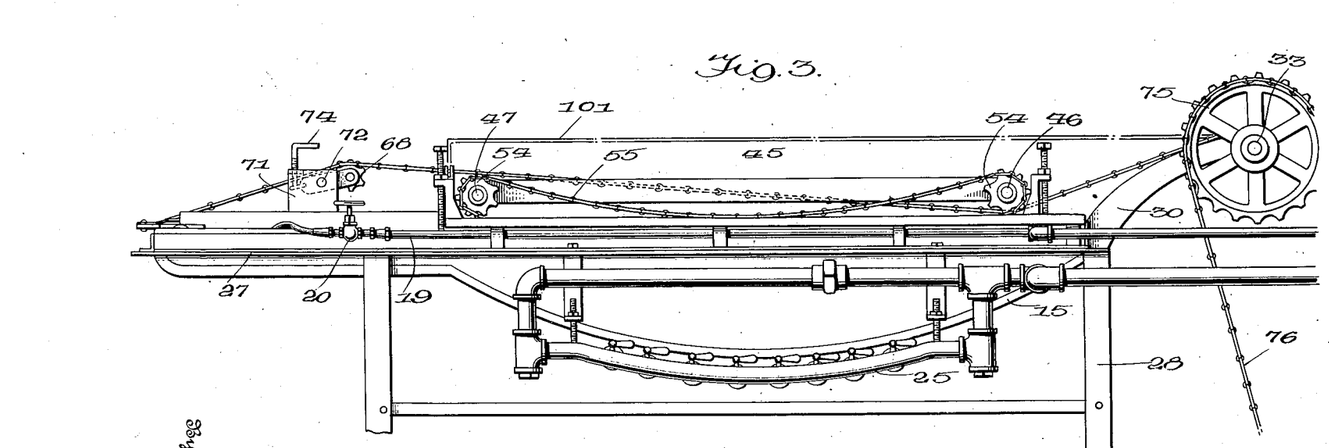
Figure 3 is a fragmentary side elevation of the machine.
Figure 4:
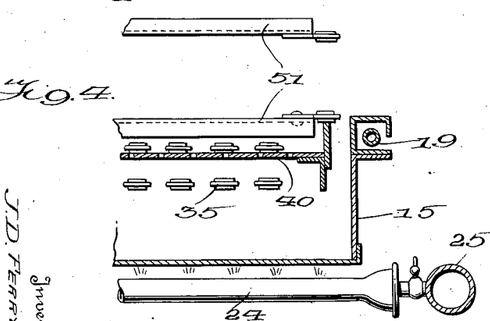
Figure 4 is a sectional view taken on line 4—4 of Figure 2.
Figure 5:
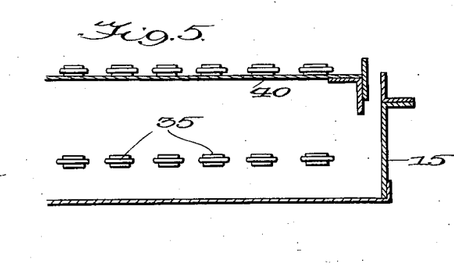
Figure 5 is a sectional view taken on line 5—5 of Figure 2.

Figures 1 and 3 illustrate that the tank 15 gradually increases in depth from both ends toward the center so that by the employment of a gauge glass 18 it is possible to observe the length of the solution by height. The liquid supply may be replenished by way of a pipe 19 having a manually controlled valve 20.

Figures 1 and 3 clearly illustrate that gas burners 24 extending from a manifold 25 are positioned beneath the tank 15 and the combustion of the gas from these burners maintains the solution in the tank at a proper temperature for cooking the pretzel forms or the like.

The tank is carried by a frame 27 supported at a suitable height by legs 28.

In carrying out the invention a conveyor frame 29 is horizontally hinged at one end to a pair of brackets 30 so that the frame and the various parts carried thereby may be moved up out of the solution to the dotted line position shown in Figure 1 to permit of the thorough and expeditious cleaning of the various parts of the machine. In explaining this, attention is invited to Figure 7 which clearly illustrates that one end of the conveyor frame 29 is provided with suitable bearings 31 received in openings in the brackets 30.

Figures 6, 7, 8, 9, 10:
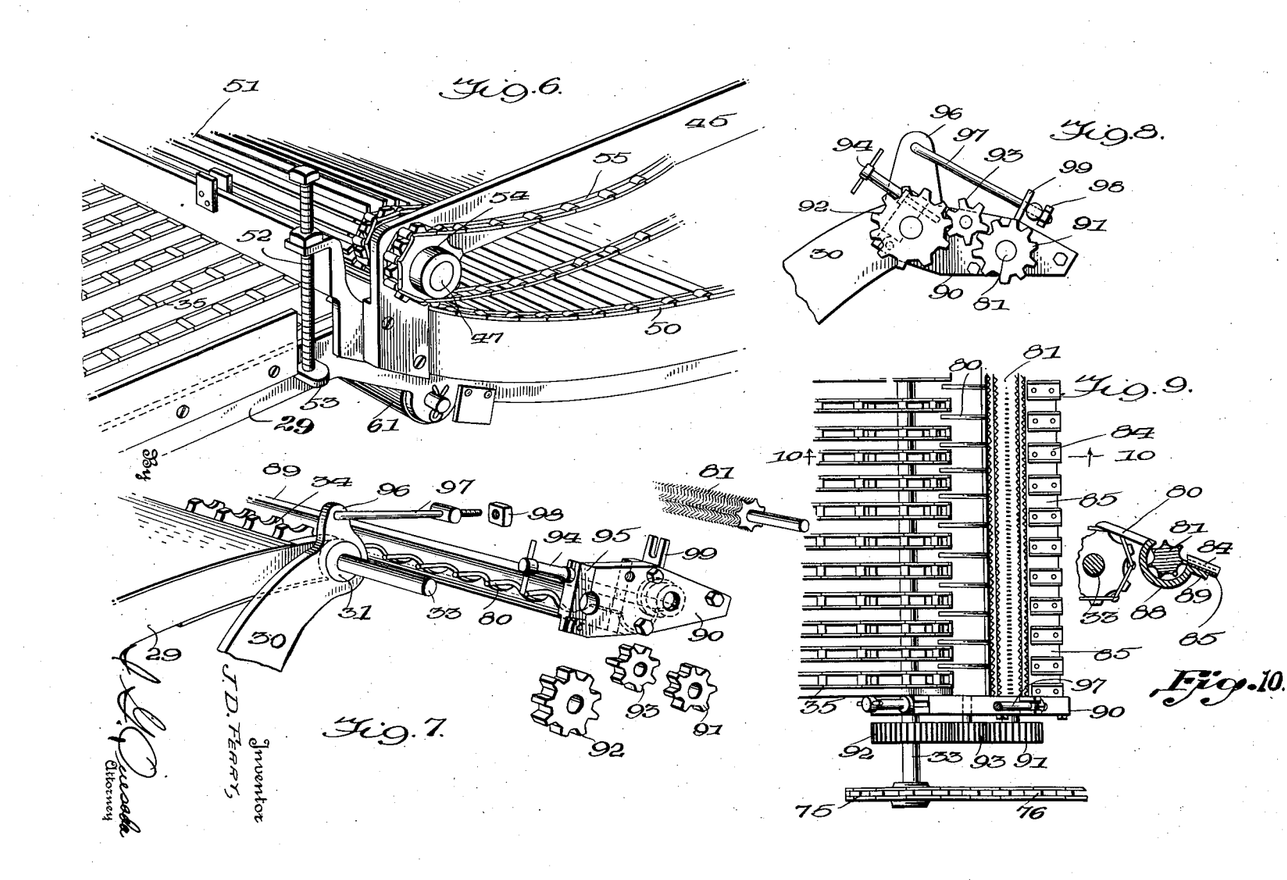

The end of the conveyor frame 29 illustrated in Figure 7 is provided with a shaft 33 upon which sprocket wheels 34 are rigidly secured. A suitably wide chain or other conveyor 35 is trained about the sprocket wheels 34 and about the sprocket wheels 36 on a shaft 37 at the receiving end of the conveyor frame. Figure 1 illustrates that the upper run of the chain conveyor 35 rides upon and is maintained in an operative position by a transverse support 40 having more or less the same contour as the bottom of the tank 15 and being freely perforated intermediate the ends thereof so that the solution in the tank may extend above the transverse support and have the necessary contact with the pretzel forms or the like. Figure 1 clearly illustrates that the support 40 is extended horizontally at the receiving end of the machine to dispose the adjacent portion of the chain conveyor 35 horizontally whereby pretzel forms or the like may be expeditiously supplied thereto.

Attention is especially directed to the fact that the conveyor 35 is composed of a number of more or less separate parallel endless chains trained about the sprocket wheels 34 and 36 and having the upper runs thereof dragging or riding upon the support 40. Thus, the separate endless chains riding upon the support 40 form a conveyor by which the pretzels or the like are conducted through the solution in the tank 15. The mounting of the upper run of the lower conveyor on the support 40 causes the same to travel in a well defined path and obviates the necessity of maintaining the lower conveyor taut. This provides a free moving and easily operated conveyor.

The perforated supporting member 40 not only functions as such for the longitudinally and transversely flexible conveyor 35, but as a baffle by which the pretzel dough forms carried by the conveyor 35 are protected against distortion and breakage by the violent agitation of the liquid solution incident to the heating thereof.

Figure 12:
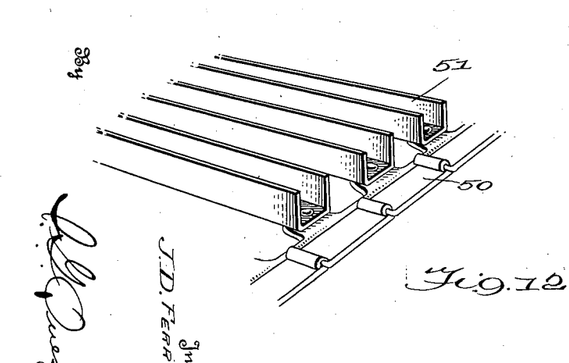
Figure 12 is a fragmentary perspective of one of the conveyors.
Figure 13:
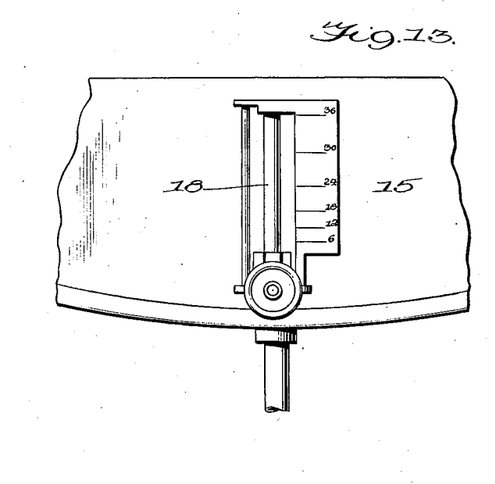
Figure 13 is a detail side elevation illustrating a gauge glass embodied in the invention.

Figures 1 and 2 illustrate that a second conveyor frame 45 is mounted above the first conveyor frame and is provided at the ends thereof with shafts 46 and 47 having sprocket wheels 48 and 49 respectively about which the chains 50 of an upper conveyor 51 are trained. Figure 12 clearly illustrates that the upper conveyor 51 is composed of a plurality of coextensive channeled members having the ends thereof suitably secured to the links of the chains 50, of which there may be one at each side of the frame.

Referring now to Figures 1, 3 and 6 it will be seen that the corners of the superframe 45 are provided with threaded legs 52 bearing against lugs 53 of the lower frame 29 so that the superconveyor frame may be adjusted with respect to the lower conveyor frame for the use of the machine in connection with pretzels of different sizes.

As shown in Figures 3 and 6 the ends of the shafts 46 and 47 are provided with sprocket wheels 54 about which the chain 55 is trained to provide for the turning of the shafts 46 and 47 at the same speed.

It will be seen with reference to Figure 6 that the conveyor chains 50 of the upper conveyor ride upon the longitudinally dipped or curved lower side members of the upper frame 45. This gives the pretzel engaging portion of the upper conveyor the form illustrated. Referring now to Figure 1 it will be seen that the longitudinally dipped or curved lower side members of the frame 45 extend substantially parallel to the curved or dipped portion of the support 40 so that the pretzel contacting portions of the upper and lower conveyors are maintained parallel.

Figure 11:
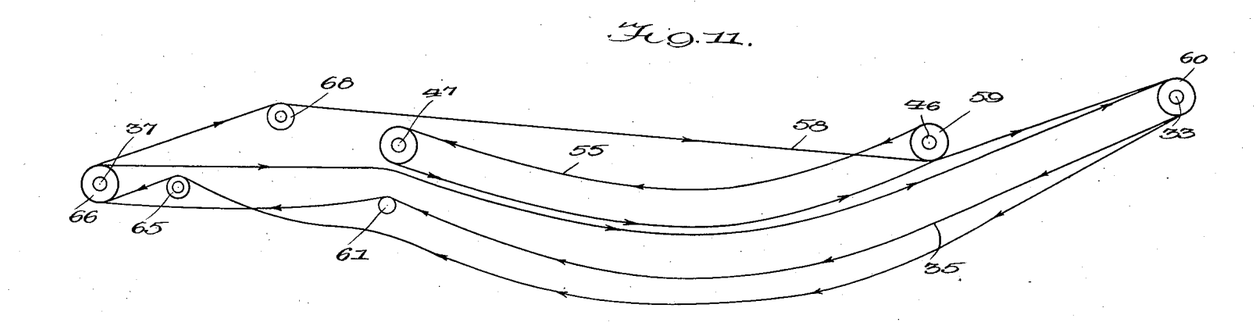
Figure 11 is a diagram of a motion transmitting mechanism embodied in the machine.

Coming now to the means by which the two conveyors 35 and 51 are operated at the same speed to conduct the pretzels or the like through the machine, attention is invited to Figures 1 and 11 which illustrate that an endless chain 58 is trained beneath and has driving engagement with a sprocket wheel 59 keyed or otherwise secured on the shaft 46. It is this engagement of the main driving chain 58 with the sprocket wheel 59 that establishes driving connection between the main drive chain 58 and the upper conveyor 51. Figure 11 also illustrates that the endless driving chain 58 is trained about a sprocket wheel 60 keyed or otherwise secured to the shaft 33 upon which the sprocket wheels 34 are also mounted. The shaft 33 may transmit power to the drive chain 58 from any suitable source as will be described later. The drive chain 58 extends from the sprocket wheel 60 over an idler sprocket wheel 65 and about a sprocket wheel 66 on the shaft 37. The shaft 37 is shown in Figure 1 to be provided with the sprocket wheels 36 about which the chain conveyor 35 is trained as previously described. Thus it is, that the main driving chain 58 has driving engagement with the upper and lower conveyors to operate these parts at the same speed.

Figure 1 illustrates that an idle sprocket 68 is engaged with the drive chain 58 and is carried by a lever 70 fulcrumed to a bracket 71 as indicated at 72. A hand screw 74 threaded through a portion of the bracket 71 has engagement with one end of the lever 70 to provide a means whereby the lever may be rocked to tighten or loosen the main drive chain. Attention is especially directed to the fact that tightening of the main drive chain 58 by the tensioning device just described will result in slackening the pretzel carrying portion of the chain conveyor 35. On the other hand, loosening of the adjusting device will result in tightening the pretzel carrying portion of the conveyor 35. This makes it a simple matter to adjust the pretzel carrying portion of the lower conveyor 35 to cause the same to drag and move easily along the perforated form giving member 40.

The main drive chain 58 may receive its power from any convenient source and by way of example only I have shown a sprocket wheel 75 secured on the shaft 33 and have extended a drive chain 76 from a source of power, not shown, about the sprocket wheel 75. For the purpose of this specification the drive chain 76 may be considered as having connection with the oven conveyor through a suitable clutch mechanism so that the conveyors of my invention will be operated at the same speed as the oven conveyor.

Figures 9 and 10 illustrate that as the pretzels leave the lower conveyor 35 they ride upon a number of fingers 80 extending between the chains of the conveyor 35 and are engaged by the radial teeth of a feed roller 81. It is the office of the toothed roller 81 acting in conjunction with the fingers 80 to positively detach the pretzels or the like from the conveyor 35 and by reference to Figure 10, it will be seen that when the pretzels leave the toothed roller 81 they move over the upstanding edges of short U-shaped strips 84 carried by a comb 85 having teeth intermeshing with the teeth of the roller 81. It is believed to be clear that the teeth of the comb 85 will positively avoid the accumulation of matter on the teeth of the roller 81 during the operation of the machine.

Figure 10 clearly illustrates that the fingers 80 are carried by one side of a longitudinally channeled bar 88, the rear side of which is flanged as indicated at 89 to provide an attaching means for the comb 85. The comb 85 may be secured in any suitable manner to the flange 89.

An important part of the invention resides in the mechanism by which the roller 81 and parts associated therewith may be adjusted with respect to the conveyor 35 and in explaining this attention is directed to the fact that the ends of the roller 81 are extended through suitable bearings in attaching arms 90 and are provided with gears 91 having connection with driving gears 92 through the medium of intermediate gears 93. The gears 92 are mounted on the ends of the shaft 33 as clearly shown in Figure 9.

The attaching arms 90 are, through the medium of hinged bearings 95, connected to and are capable of adjustment about the shaft 33 so as to change the position of the roller 81 and associated parts with respect to the conveyor 35. Should it be desired to remove the arms 90, the roller 81 and parts associated therewith it is simply necessary to release the retainers 94 of the hinged bearings 95 whereupon the bearings may be disengaged from the shaft 33 and the arms 90 and parts carried thereby withdrawn as a unit.

The terminals of the brackets 30 are provided with apertured ears 96 to which bolts 97 are connected and the bolts are provided with nuts 98 engaged with the rear sides of lugs 99 extending upwardly from the arms 90 at points spaced from the shaft 33 so that adjustment of the nuts 98 will result in changing the position of the roller 81 and associated parts. It might be noted at this point that the transversely curved member 88 is welded or otherwise secured at the ends thereof to the attaching arms 90 so that these parts are caused to move together.

The steam generated incident to the heating of the cooking solution is collected by a hood 101 extending over the tank and having a reasonably tight connection therewith. Figure 1 clearly illustrates that one end of the hood is extended up over the outlet end portion of the conveyor 35 to discharge the steam collected by the hood into contact with the pretzel forms upon leaving the solution to better prepare the pretzel forms for the application and adhesion of salt thereto and to improve the appearance and quality of the pretzels.

The steam issuing from the solution in the tank is also utilized to avoid the accumulation of solid particles on such moving parts of the machine as the conveyors and the sprockets therefor. More specifically, the contact of the steam with the conveyors and other moving parts of the machine dissolves the matter thereon so that the machine is rendered self cleansing to some extent at least.

In operation pretzel forms or the like are supplied by any suitable means to the horizontally disposed receiving portion of the conveyor 35 and are carried into and through the solution in the tank 15. As the pretzel forms enter the tank, the same are engaged by the upper conveyor 51 so that the same are prevented from floating. Also the upper conveyor forces the pretzels into sufficient pressure contact with the lower conveyor 35 to establish that degree of traction between the pretzels and the conveyor necessary to avoid slipping of the pretzels as the same approach the upwardly inclined discharge portion of the conveyor. In other words, the slight protuberances of the chain conveyor 35 are embedded in the under sides of the pretzels to assure the upward movement of the pretzels as the discharge end of the machine is approached.

One of the most important features of the invention is illustrated in Figure 1 wherein it is shown that the main drive chain 58 passes through the tank 15 and the solution therein along with the upper and lower conveyors so that the main drive chain and the conveyors are maintained at substantially the same temperature. Thus, uniform expansion and contraction of the two conveyors and the drive shaft therefor is assured.

As previously suggested it is a simple matter to adjust the conveyors for use in cooking and handling large or small pretzels by adjusting one conveyor with respect to the other. The contact of the several conveyors with the pretzel or other forms is such that the uniform movement of the pretzels through the machine is assured as evidenced by the regular discharge of the pretzels onto the oven conveyor during the operation of the machine.

Figure 1 illustrates that the several conveyors and the parts associated therewith may be swung as a unit to and elevated position to render the same and the tank accessible for cleaning, inspection or any other purpose. Suitable means such as a block and pulley or a cranking mechanism may be employed to swing the conveyor to elevated position and since such means forms no part of this invention no illustration of the same appears.

When the conveyor is elevated the solution remaining in the tank may be employed to clean the conveyors and the driving means therefor. Also the solution has been found to be useful in washing the discharge roller 81 and associated parts at the end of an operating period. A suitable discharge pipe 107 may be employed to drain the tank. Also it will be seen that there is little opportunity for the entrance of dirt and the like to enter the tank during the operation of the machine since the tank is substantially enclosed by the hood 101.

A pretzel cooking and handling machine constructed in accordance with this invention may by reason of its extreme simplicity and durability be operated by those of limited skill.

It is to be understood that the form of invention herewith shown and described is to be taken merely as a preferred example of the same and that such minor changes in arrangement and construction of parts may be made as will remain within the spirit of the invention and the scope of what is claimed.

Having thus described the invention, what is claimed is:

1. A material treating and handling apparatus comprising a tank adapted for the reception of a liquid, a heater for the liquid, a conveyor to conduct the material through the liquid in the tank, and a driving mechanism for said conveyor so correlated with said conveyor that by varying the tension of said driving mechanism the tension of the material-carrying portion of said conveyor is varied, said driving mechanism extending through the liquid in said tank whereby the conveyor and the driving mechanism therefor are maintained at substantially the same temperature.

2. A material treating and handling apparatus comprising a tank adapted for the reception of a liquid, a heater for the liquid, a conveyor to conduct the material through the liquid in the tank, a driving mechanism for said conveyor and extending through the liquid in said tank whereby the conveyor and the driving mechanism therefor are maintained at substantially the same temperature, a second conveyor arranged above the first-named conveyor and having operative connection with said driving mechanism, and a plate extending across said tank to form a support for the first named conveyor and constituting a baffle protecting the material carried by the first named conveyor from agitation of the liquid incident to the heating of the same.

3. A material cooking and handling apparatus comprising a tank adapted for the reception of a liquid, a heater for the liquid, a conveyor to conduct the material through the liquid in the tank, a driving mechanism for said conveyor and extending through the liquid in said tank whereby the conveyor and the driving mechanism therefor are maintained at substantially the same temperature, and a hood above said tank to receive steam generated incident to the heating of the liquid in the tank, said hood being shaped to direct steam into intimate contact with the material on the conveyor adjacent the discharge end thereof.

4. A material cooking and handling apparatus comprising a tank adapted for the reception of a liquid, a heater for the liquid, a conveyor to conduct the material through the liquid in the tank, a driving mechanism for the conveyor and extending through the liquid in said tank whereby the conveyor and the driving mechanism therefor are maintained at substantially the same temperature, a second conveyor having connection with said driving mechanism, a hood above said tank to receive steam generated incident to the heating of the liquid in the tank, said hood being shaped to direct steam into contact with the material on the conveyor adjacent the discharge end, and adjustable supports by which one conveyor may be adjusted with respect to the other conveyor.

5. A material cooking and handling apparatus comprising a tank adapted for the reception of a liquid, a conveyor horizontally hinged at one end having the intermediate portion thereof normally extended into said tank, and driving means for said conveyor at both ends thereof, said conveyor being freely removable from the tank without disconnecting said driving means.

6. A material cooking and handling apparatus comprising a tank adapted for the reception of a liquid, a horizontally hinged conveyor having a portion thereof normally extended into said tank, said conveyor being freely removable from said tank to afford access to the tank and the conveyor, a second conveyor carried by and movable with said first-named conveyor and positive driving means at the opposite ends of the second conveyor between which said second conveyor is freely suspended.

7. A material handling apparatus comprising a tank adapted for the reception of a liquid, a hinged conveyor normally extended into said tank and being freely removable on the hinge thereof to afford access to the tank and the conveyor, and a driving chain having positive connection with both ends of the conveyor and being extended through said tank, said conveyor and said driving means being freely removable as a unit from the tank.

8. A material handling apparatus comprising a tank adapted for the reception of a liquid, a hinged conveyor normally extended into said tank and being freely removable therefrom to afford access to the tank and the conveyor, a second conveyor carried by and movable with said first-named conveyor and a driving chain having positive connection with both ends of both conveyors and being extended through said tank.

9. A material handling apparatus comprising a conveyor having a shaft, an attaching arm having a bearing member on said shaft, a toothed roller having connection with said attaching arms, means operatively connecting said roller to said shaft, and means whereby said roller may be adjusted with respect to said conveyor.

10. A material handling apparatus comprising a conveyor having a shaft, an attaching arm having a bearing member on said shaft, a toothed roller having connection with said attaching arms, means operatively connecting said roller to said shaft, means whereby said roller may be adjusted with respect to said conveyor, and a comb for cleaning said roller.

11. A material handling apparatus comprising a conveyor having a shaft, an attaching arm having a bearing member on said shaft, a toothed roller having connection with said attaching arm, means operatively connecting said roller to said shaft, means whereby said roller may be adjusted with respect to said conveyor, a comb for cleaning said roller, and a support for said comb and being provided with fingers to convey the material from said conveyor to said roller.

12. A material cooking and handling apparatus comprising a conveyor, a tank adapted to receive a liquid and said conveyor, a heater for the liquid in said tank, a second conveyor associated with said first-named conveyor, a driving chain having connection with the first and second-named conveyors, and a steam collecting hood extending over the tank and enclosing substantial portions of the conveyors, said hood being shaped to direct the steam into contact with the material engaged by said conveyor adjacent the discharge end of said conveyor.

13. In a machine of the character specified the combination of a conveyor, a shaft having supporting means engaging said shaft and having detachable retaining means, and a plurality of separate supporting and conducting devices carried by said arms, the retainers of said hinged bearings being releasable to permit of the disconnection of said arms from the shaft.

14. In a pretzel treating and cooking machine, the combination of a conveyor, a shaft having means supporting the conveyor, arms having attaching means detachably engaged with said shaft, a longitudinally channeled member connected to said arms and having fingers adjacent said conveyor to receive material therefrom, a toothed roller partially received in said longitudinally channeled member, a comb having teeth engaged with said roller, and material conducting devices carried by said comb.

15. A machine of the class described comprising a conveyor consisting of separate laterally spaced chains having upper and lower runs, the upper run being adapted for supporting articles, and a liquid-containing tank receiving the runs of said conveyor and having a curved guide plate between said runs and forming a support for the upper run, whereby the upper run takes the form of said curved plate while the lower run agitates the liquid below said plate.

16. A machine of the class described comprising a conveyor having upper and lower runs, the upper run being adapted for supporting articles, and a liquid-containing tank receiving said conveyor and having a curved combination baffle and guide perforated plate supporting the upper run, whereby the upper run takes the form of said curved plate while the lower run agitates the liquid below said plate.

17. In a machine of the class described, a tank, a guide plate having an intermediate part of depressed curvature disposed in said tank, a conveyor having a run resting upon said plate and assuming the curvature thereof, a second conveyor freely suspended above said supported run having the lower run spaced a constant distance from said supporting run, common driving means for said conveyors for synchronizing the speed thereof, said driving means being in positive driving connection with both ends of the upper conveyor for maintaining the symmetrical curvature of said upper conveyor while running.

18. In a machine of the class described, a tank adapted for the reception of a material treating solution, a heater for the material treating solution, and a longitudinally and transversely flexible conveyor having an upper run extending through the tank, said tank being provided with a combination baffle and guide member of depressed curvature extending across the upper run of the longitudinally and transversely flexible conveyor to support the same whereby the upper run takes the form of said guide member.

19. In a machine of the class described, a tank adapted for the reception of a material treating solution, and a longitudinally and transversely flexible conveyor having an upper run extending through the tank, said tank being provided with a guide member of depressed curvature extending across the upper run of the longitudinally and transversely flexible conveyor to support the same whereby the upper run takes the form of said guide member, a driving member engaged with said conveyor at the junction of the upper and lower runs thereof, and an adjusting device engaged with said driving member between opposite ends of the conveyor to tighten or loosen one of the runs of said conveyor.

20. In a machine of the class described, a tank adapted for the reception of a liquid, a heater for the liquid, a material conducting conveyor extending through the tank, a hood above said tank to receive steam generated incident to the heating of the liquid in the tank, said hood being shaped to direct steam into intimate contact with the material adjacent the discharge point thereof.

21. In a machine of the class described, a tank adapted for the reception of a material treating solution and being provided at a point above the bottom of the tank with a combination guide and baffle of depressed curvature, a heater for the material treating solution, and a conveyor having an upper run mounted on said combination guide and baffle and taking the form thereof, said conveyor being adapted for supporting articles of food.

22. In a material handling apparatus, a tank adaptable for the reception of a liquid, a conveyor in the tank and having a hinge member beyond the tank and about which the conveyor may be swung to remove the same from the tank or to introduce the conveyor into the tank.

23. In a material handling apparatus, a tank adaptable for the reception of a liquid, a conveyor in the tank and having a hinge member at one end and about which the conveyor may be swung to remove the same from said tank or to introduce the conveyor into the tank, and a motion transmitting member connected to the conveyor and movable into and out of the tank with the conveyor, said hinge member for the conveyor being located beyond the tank in spaced relation to one end thereof.

24. In a material handling apparatus, a tank adaptable for the reception of a liquid, a conveyor in the tank and having a hinge member at one end and forming a means by which the conveyor may be swung into and out of the tank, a second conveyor movable with the first named conveyor, and a motion transmitting member connected to the first and second named conveyors and movable into and out of the tank with the conveyors.

25. In a material handling apparatus, a tank adaptable for the reception of a liquid, a conveyor in the tank and having a hinge member at one end thereof and forming a means by which the conveyor may be swung into or out of the tank, and a driving member extending from a remote source of power and connected to said conveyor, said conveyor being removable from the tank without disconnecting said driving member.

26. In a machine of the class described, a tank adaptable for the reception of a liquid, a heater for the liquid, a material conducting conveyor associated with the tank, a hood above said tank to receive steam generated incident to the heating of the liquid in the tank, said hood being shaped to direct steam into intimate contact wth a portion of the conveyor to cleanse the same.

27. In a material handling apparatus, a tank, a conveyor movable into and out of said tank and having one end extended beyond the same, means connected to said extended end of said conveyor to hingedly support the conveyor, and a driving element having operative connection with the extended end of said tank.

In testimony whereof I affix my signature.

JOSEPH D. FERRY.